(12) United States Patent
Guilloteau

(10) Patent No.: US 10,766,593 B2
(45) Date of Patent: Sep. 8, 2020

(54) AIRCRAFT ASSEMBLY COMPRISING A SELF-STIFFENED PANEL COMPRISING A PORTION OF INCREASING HEIGHT BY MEANS OF WHICH THE PANEL IS FIXED TO A STRUCTURAL ELEMENT

(71) Applicant: Airbus Operations SAS, Toulouse (FR)

(72) Inventor: Damien Guilloteau, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 327 days.

(21) Appl. No.: 15/827,037

(22) Filed: Nov. 30, 2017

(65) Prior Publication Data

US 2018/0148152 A1 May 31, 2018

(30) Foreign Application Priority Data

Nov. 30, 2016 (FR) .................................. 16 61684

(51) Int. Cl.
  *B64C 1/06* (2006.01)
  *B64C 1/10* (2006.01)
  *B64C 1/12* (2006.01)
  *B64C 1/14* (2006.01)

(52) U.S. Cl.
  CPC .............. *B64C 1/061* (2013.01); *B64C 1/064* (2013.01); *B64C 1/10* (2013.01); *B64C 1/12* (2013.01); *B64C 1/1461* (2013.01); *B64C 1/1492* (2013.01)

(58) Field of Classification Search
  CPC ....... B64C 1/064; B64C 1/065; B64C 1/1461; B64C 1/1492; B64C 1/061; B64C 1/10; B64C 1/12
  See application file for complete search history.

(56) References Cited

U.S. PATENT DOCUMENTS

| 2,230,393 | A | * | 2/1941 | Thomson | ................. B64C 3/00 244/124 |
| 2,330,219 | A | * | 9/1943 | Kemmer | ................. B64C 1/12 244/133 |
| 4,725,334 | A | | 2/1988 | Brimm | |

(Continued)

FOREIGN PATENT DOCUMENTS

GB          128131          6/1919

OTHER PUBLICATIONS

French Search Report, dated Jun. 12, 2017, priority document.

*Primary Examiner* — Philip J Bonzell
(74) *Attorney, Agent, or Firm* — Greer, Burns & Crain, Ltd.

(57) ABSTRACT

In order to allow robust assembly in an aircraft between a structural element and a self-stiffened panel comprising a skin and a stiffening structure formed of a network of ribs extending out from a first face of the skin, the structural element comprises at least one end formed of a first closure rib, the stiffening structure comprises at least one end formed of a second closure rib, and a portion the height of which increases progressively as far as the second closure rib, and the structural element being fixed to the self-stiffened panel via first through-fixing elements which fix the first closure rib to the second closure rib. The structural element comprises a sole exhibiting a second face having an inset delimiting a space which accepts an end part of the skin.

15 Claims, 3 Drawing Sheets

(56) References Cited

U.S. PATENT DOCUMENTS

| | | | | |
|---|---|---|---|---|
| 5,501,414 A | * | 3/1996 | Bauer | B64C 3/18 |
| | | | | 244/123.4 |
| 6,375,120 B1 | * | 4/2002 | Wolnek | B32B 5/28 |
| | | | | 244/119 |
| 2004/0035979 A1 | * | 2/2004 | McCoskey, Jr. | B64C 1/12 |
| | | | | 244/117 R |
| 2004/0055349 A1 | * | 3/2004 | El-Soudani | B21D 26/08 |
| | | | | 72/56 |
| 2008/0149769 A1 | | 6/2008 | Koch et al. | |
| 2010/0327113 A1 | * | 12/2010 | Marquez Lopez | B64C 1/064 |
| | | | | 244/119 |

* cited by examiner

AIRCRAFT ASSEMBLY COMPRISING A SELF-STIFFENED PANEL COMPRISING A PORTION OF INCREASING HEIGHT BY MEANS OF WHICH THE PANEL IS FIXED TO A STRUCTURAL ELEMENT

CROSS-REFERENCES TO RELATED APPLICATIONS

This application claims the benefit of the French patent application No. 1661684 filed on Nov. 30, 2016, the entire disclosures of which are incorporated herein by way of reference.

TECHNICAL FIELD

The present invention relates to the field of aircraft structures and relates more particularly to the structural connection between a self-stiffened panel and a structural element.

BACKGROUND OF THE INVENTION

In conventional aircraft it is commonplace to use panels made up of a skin and of stiffeners fixed to the skin in order to give it the necessary stiffness. The skin is, in general, several millimeters thick. As for the stiffeners, these are, for example, T-section or I-section stiffeners, each having a flange (sole) by means of which they are assembled with the skin, generally by riveting.

These stiffeners have a web of a height sufficient to allow the stiffeners to be assembled with one another and with the surrounding structure by means of fishplates fixed to the webs of the stiffeners.

FIG. 1 illustrates one example of such a conventional panel 10, in this instance a panel extending over the windscreen 12 of an airplane and connected to the upper surround 14 of the windscreen and to a circumferential fuselage frame 15. Such a panel is sometimes referred to as a "windscreen visor."

FIG. 1 shows the skin 16 of the panel 10 and stiffeners 18 thereof, which are sometimes referred to as "uprights." These stiffeners are connected to one another, to the surround 14 or to the circumferential frame 15 by means of fishplates.

FIG. 2 thus illustrates the connection between two of the stiffeners 18A and 18B of the panel 10 by means of fishplates 20.

However, recent developments in aircraft construction tend to promote the use of self-stiffened panels, which means to say panels made up of a skin and of a stiffening structure incorporated into the skin.

The use of self-stiffened panels, in general, makes it possible to reduce the number of components and the number of assembly operations, to reduce the number of fixing elements and therefore the mass of the panel, and to improve the stiffness of the panel.

However, the relatively short height of the ribs that make up the stiffening structure of such a panel and the relatively high density of these ribs do not allow the stiffening structure to be assembled with the surrounding structure using fishplates.

SUMMARY OF THE INVENTION

The invention has a particular objective of affording a simple, economical and effective solution to this problem.

To this end it proposes an aircraft assembly comprising a structural element and a self-stiffened panel comprising a skin and a stiffening structure incorporated into the skin and formed of a network of ribs.

According to the invention, the structural element comprises at least one end formed of a first closure rib.

In addition, the stiffening structure of the self-stiffened panel comprises at least one end formed of a second closure rib, and the stiffening structure of the self-stiffened panel comprises a portion the height of which increases progressively as far as the second closure rib.

Finally, the structural element is fixed to the self-stiffened panel by means of first through-fixing elements which fix the first closure rib to the second closure rib.

The structural element comprises a sole exhibiting a first face on the side of which the first closure rib is formed, and a second face on an opposite side, and the sole exhibits, on the second face, an inset delimiting a space into which an end part of the skin of the self-stiffened panel extends, the inset delimiting an end part of the sole, of which the first closure web forms a flanged web.

The structural element is thus juxtaposed with the self-stiffened panel.

The progressive increase in height of the stiffening structure means that the second closure rib can be made tall enough to allow this rib to be fixed to the first closure rib by means of through-fixing elements capable of working in tension.

Such a joint with the second closure rib pressing against the first closure rib also allows optimal transfer of load between the structural element and the self-stiffened panel.

The invention thus allows effective fixing-together of the self-stiffened panel and the structural element, while at the same time maintaining a reduced height as far as the majority of the stiffening structure is concerned.

In one preferred embodiment of the invention, the portion of the stiffening structure of the self-stiffened panel is formed of chamfered ribs which are inclined with respect to the second closure rib and connect the latter to another rib of the stiffening structure.

The other rib of the stiffening structure preferably extends parallel to the second closure rib.

Moreover, the first fixing elements preferably pass jointly through the first closure rib and the second closure rib.

The first fixing elements are advantageously tension bolts.

As an alternative, the first fixing elements may be incorporated into the first closure rib and pass through the second closure rib, or the first fixing elements may be incorporated into the second closure rib and pass through the first closure rib.

The end part of the sole of the structural element and the end part of the skin of the self-stiffened panel are advantageously fixed together by means of second through-fixing elements.

The second fixing elements preferably pass jointly through the end part of the sole and the end part of the skin.

The second fixing elements are preferably rivets.

As an alternative, the second fixing elements may be incorporated into the end part of the sole and pass through the end part of the skin, or the second fixing elements may be incorporated into the end part of the skin and pass through the end part of the sole.

In one preferred embodiment of the invention, the structural element comprises a main rib, and secondary ribs which connect the main rib to the first closure rib. In addition, the main rib and the secondary ribs project out from the first face of the sole.

In this case, each of the secondary ribs preferably extends facing a region of connection to the second closure rib of at least one rib belonging to the network of ribs of the stiffening structure, which rib is arranged on the other side of the second closure rib to the first closure rib.

In addition, the secondary ribs preferably each have a height which decreases in a direction extending from the main rib towards the first closure rib.

In one preferred embodiment of the invention, the structural element is a windscreen surround, and the self-stiffened panel forms a visor or a fuselage deflector, or in which the structural element is a door or window surround, and the self-stiffened panel is a fuselage panel, or in which the structural element is a sealed bulkhead surround, and the self-stiffened panel forms an aircraft fuselage front or rear sealed bulkhead.

BRIEF DESCRIPTION OF THE DRAWINGS

The invention will be better understood, and further details, advantages and features thereof will become apparent from reading the following description given by way of nonlimiting example and with reference to the attached drawings in which.

In all of these figures, identical references may denote elements that are identical or analogous.

DETAILED DESCRIPTION OF THE PREFERRED EMBODIMENTS

Figure 1:
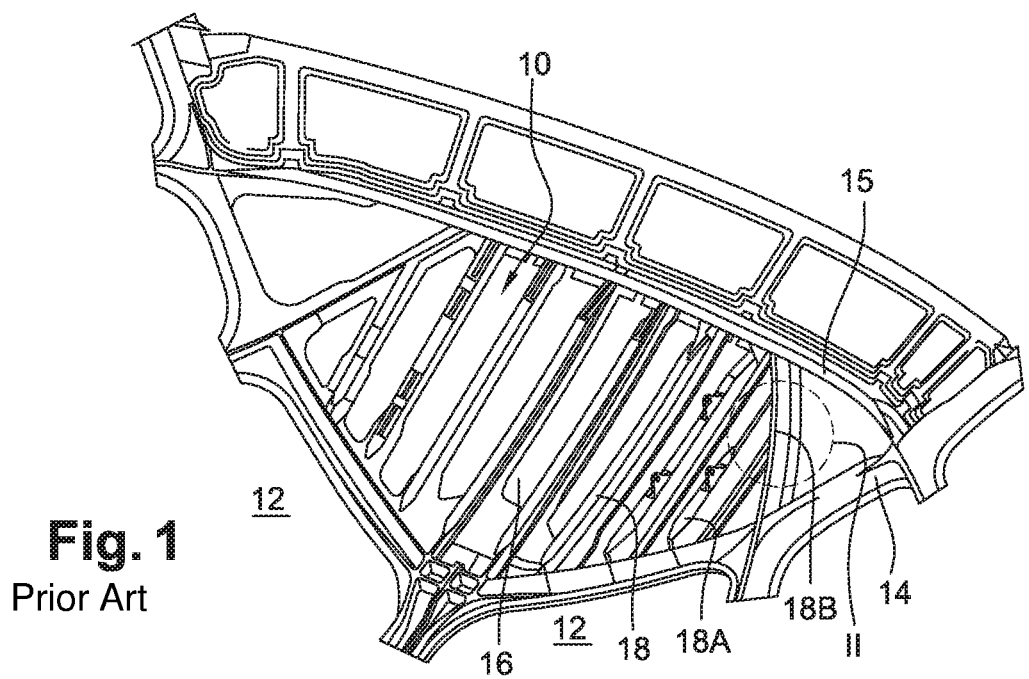
FIG. 1, already described, is a partial schematic view from beneath of an upper part of a conventional aircraft nose, illustrating part of a windscreen surround and a conventional panel provided with stiffeners assembled onto it.
Figure 2:
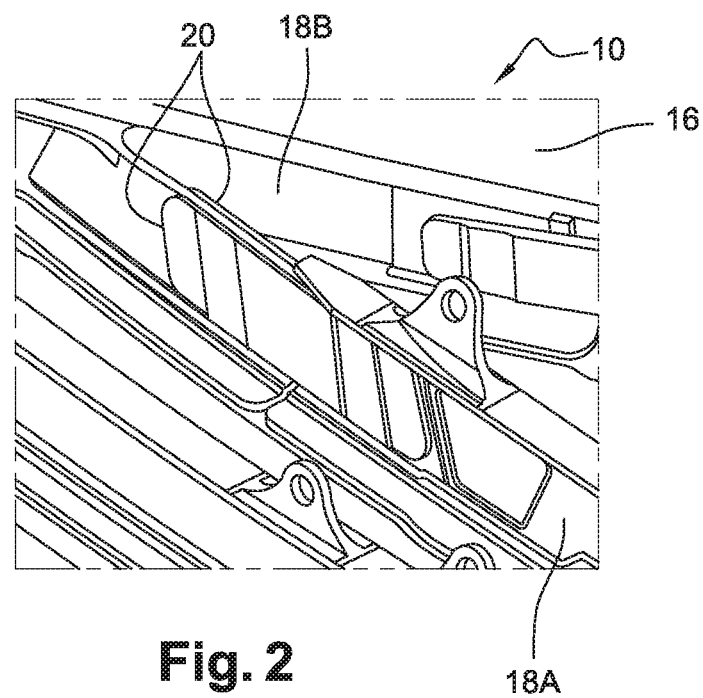
FIG. 2, already described, is a view on a larger scale of detail II of FIG. 1.
Figure 3:
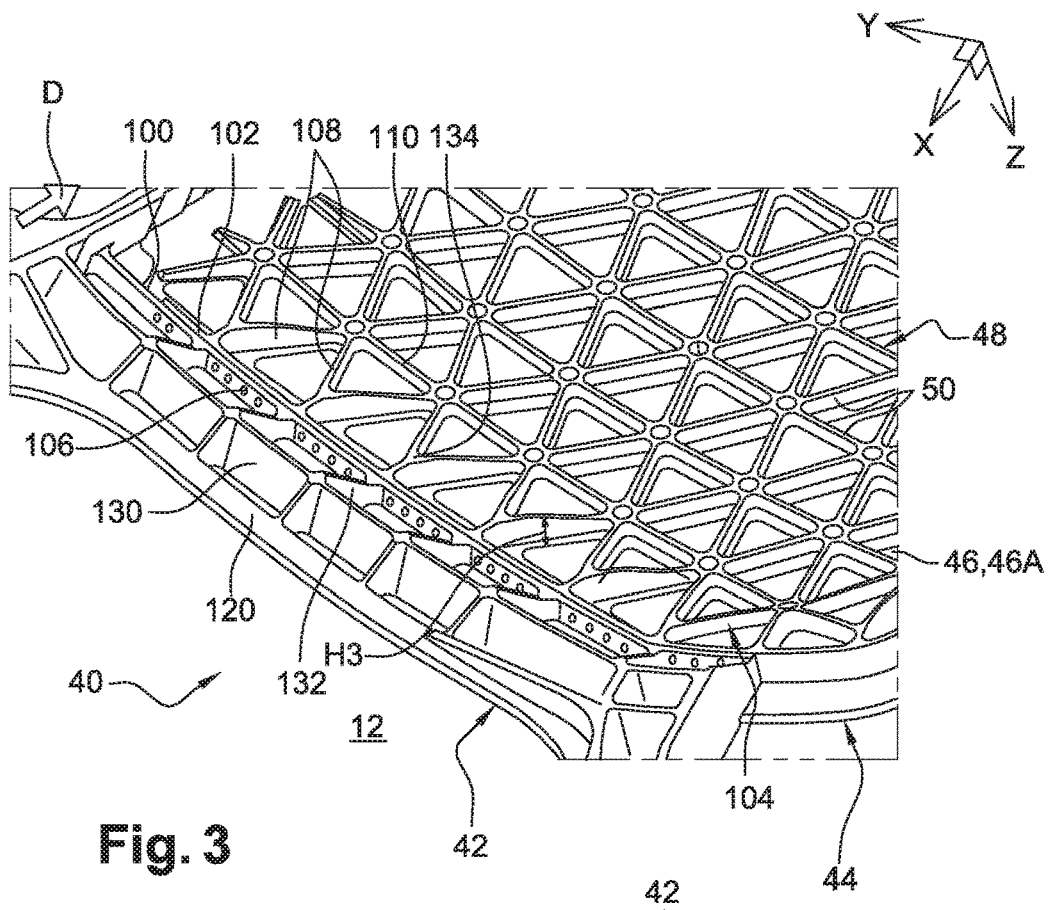
FIGS. 3 and 4 are perspective partial schematic views, respectively from the inside, of an aircraft assembly according to a preferred embodiment of the invention, comprising a self-stiffened panel and a structural element assembled therewith.
Figure 4:
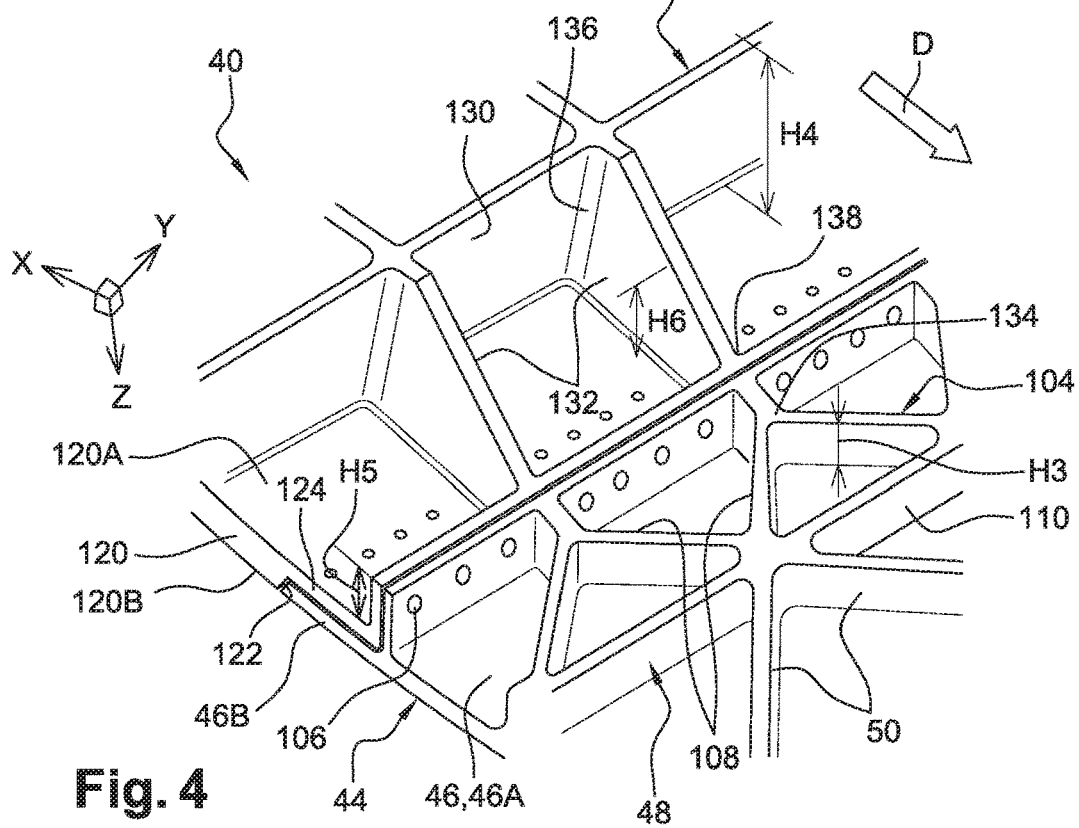
Figure 5:
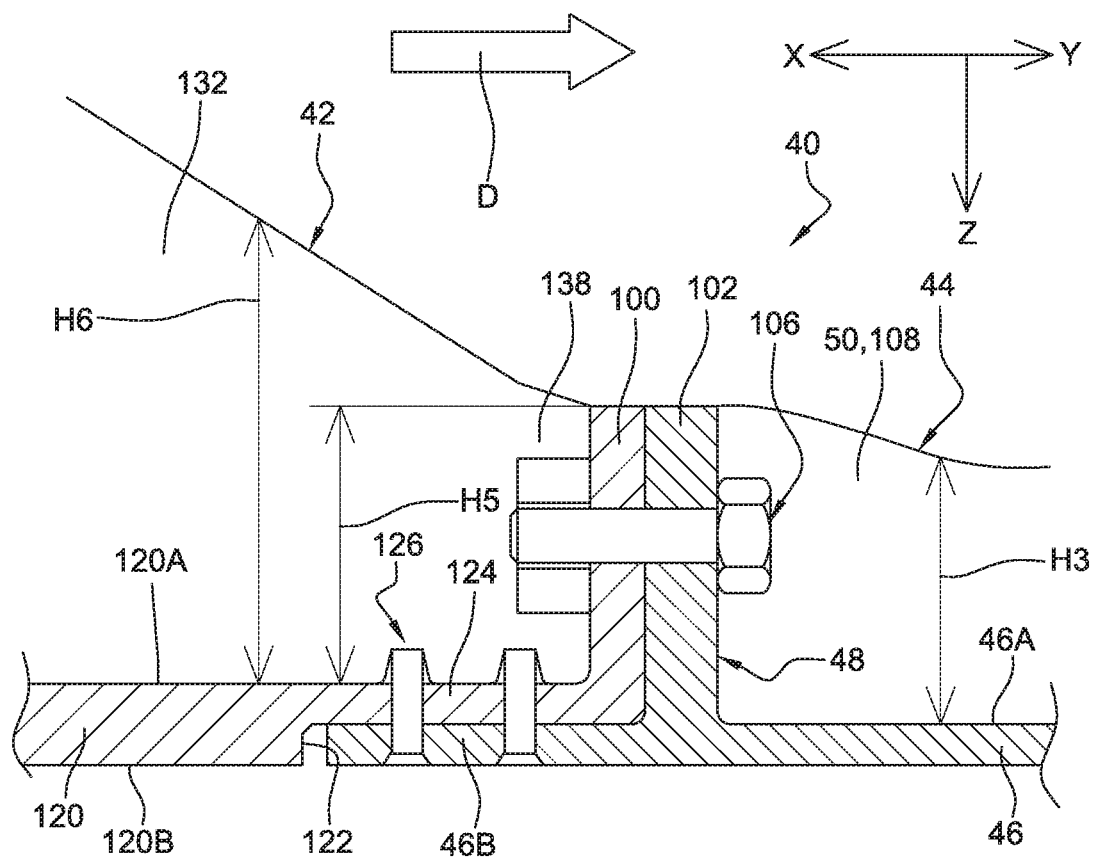
FIG. 5 is a partial schematic view in cross section of the aircraft assembly of FIG. 3.

FIGS. 3-5 illustrate an aircraft assembly 40, comprising a structural element 42, in this instance a windscreen upper surround, and a self-stiffened panel 44 comprising a skin 46 and a stiffening structure 48 incorporated into the skin 46. This stiffening structure is, in general, formed of a network of ribs 50 extending out from a first face 46A of the skin, which face is intended to be positioned on the inside of an aircraft equipped with the assembly 40.

In the description which follows, the directions X, Y and Z form a direct orthonormal frame of reference and correspond respectively to the longitudinal, transverse and vertical directions of the aircraft assembly 40, these respectively corresponding to the longitudinal, transverse and vertical directions of an aircraft equipped with the assembly 40. The longitudinal direction X is oriented in a direction of travel of such an aircraft.

In the example illustrated, the panel 44 extends over the windscreen 12 and is therefore of the type sometimes referred to as a "visor."

In addition, the network of ribs 50 is of the "isogrid" type, also referred to as an "isogrid network," which means to say, formed of a triangular network of ribs 50. Other configurations of networks are, of course, possible within the context of the present invention, for example a network of the "orthogrid" type, which means to say, a network with rectangular or square grid cells, or even a network with changeable triangular grid cells, which means to say, formed of triangles of dimensions that vary according to the region of panel considered. More generally, all possible network configurations are compatible with the present invention.

As shown in FIGS. 3 to 5, the structural element 42 comprises at least one end formed of a first closure rib 100, and the stiffening structure 48 of the self-stiffened panel 44 comprises at least one end formed of a second closure rib 102.

In addition, the stiffening structure 48 comprises a portion 104, of which the height H3 increases as far as the second closure rib 102.

Finally, the structural element 42 is fixed to the self-stiffened panel 44 by means of first through-fixing elements 106. In the example illustrated, these first fixing elements 106 pass jointly through the first closure rib 100 and the second closure rib 102. As an alternative, the first fixing elements 106 may be incorporated into the first closure rib 100 and pass through the second closure rib 102, or vice versa.

The first fixing elements 106 are preferably tension bolts, as illustrated in FIG. 5.

The progressive increase in height of the stiffening structure in the region of the portion 104 thereof means that the second closure rib 102 can be made tall enough to allow this rib 102 to be fixed to the first closure rib 100 by means of through-fixing elements capable of working in tension, such as tension bolts.

This way of fixing the self-stiffened panel 44 to the structural element 42 is thus compatible with a small height as regards the majority of the stiffening structure 48, because, in the context of the invention, only a portion 104 of this structure has an increased height.

Such a joint with the second closure rib 102 pressing against the first closure rib 100 also allows optimal transfer of load between the structural element 42 and the self-stiffened panel 44.

The number of respective ends of the structural element 42 and of the self-stiffened panel 44 involved in the mode of assembly proposed by the invention may be greater than one, particularly in the case in which the structural element 42 and the self-stiffened panel 44 exhibit at least one corner, on each side of which these components are assembled.

In the preferred embodiment of the invention, the aforementioned portion 104 of the stiffening structure 48 is formed of chamfered ribs 108 which are inclined with respect to the second closure rib 102. These chamfered ribs 108 connect the second closure rib 102 to another rib 110 of the stiffening structure 48, which other rib 110 extends substantially parallel to the second closure rib 102.

The chamfered ribs 108 allow good transmission of load from the second closure rib 102 to the rest of the stiffening structure 48.

In the example illustrated, the structural element 42 comprises a sole 120 having a first face 120A on the side of which the first closure rib 100 is formed, and a second face 120B on an opposite side (FIGS. 4 and 5).

The sole 120 has, on its second face 120B, an inset 122 delimiting a space into which an end part 46B of the skin 46 of the self-stiffened panel 44 extending beyond the stiffening structure 48 extends. The first closure rib 100 forms a flanged web of an end part 124 of the sole 120 delimited by the inset 122.

In addition, the end part 124 of the sole 120 of the structural element and the end part 46B of the skin 46 of the self-stiffened panel are fixed together by means of second through-fixing elements 126 which pass jointly through the end part 124 of the sole and the end part 46B of the skin. The second fixing elements 126 are preferably rivets. As an alternative, the second fixing elements 126 may be incorporated into the end part 124 of the sole and pass through the end part 46B of the skin, or vice versa.

The mutual overlap between the end part 124 of the sole 120 of the structural element and the end part 46B of the skin 46 of the self-stiffened panel, and the fixing-together of these elements by means of the second fixing elements 126, make it possible to improve sealing at the joint between the structural element 42 and the self-stiffened panel 44.

In the preferred embodiment of the invention, the structural element 42 comprises a main rib 130 (FIGS. 3 and 4), and secondary ribs 132 which connect the main rib 130 to the first closure rib 100.

As shown by FIGS. 3-5, the main rib 130 and the secondary ribs 132 project out from the first face 120A of the sole 120 of the structural element 42.

Each of the secondary ribs 132 advantageously extends facing a region 134 of connection to the second closure rib 102 of at least one rib belonging to the network of ribs 50 of the stiffening structure 48, which rib is arranged on the other side of the second closure rib 102 to the first closure rib 100. In the example illustrated, each region 134 is thus a region of connection of two corresponding chamfered ribs 108 to the second closure rib 102.

Alignment between the secondary ribs 132 of the structural element 42 on the one hand, and the regions of connection 134 of ribs of the stiffening structure 48 to the second closure rib 102 on the other, allows optimum continuity of load between the structural element 42 and the stiffening structure 48 of the self-stiffened panel 44.

In the example illustrated, the main rib has a height H4 (FIG. 4) that is higher than the height H5 (FIGS. 4 and 5) of the first closure rib 100. In addition, the secondary ribs 132 each have a height H6 (FIGS. 4 and 5) which decreases in a direction D extending from the main rib 130 towards the first closure rib 100. Thus, each secondary rib 132 has a first end 136 (FIG. 4) connected to the main rib 130 and of a height equal to the height H4 thereof, and an opposite, second, end 138 connected to the first closure rib 100 and of a height equal to the height H5 thereof (FIGS. 4 and 5).

In the particular case of a panel adjacent to the windscreen of an aircraft, the use of a self-stiffened panel, in particular, allows better ability to withstand birdstrike or collisions with other projectiles likely to strike the nose of an aircraft.

The aircraft assembly according to the invention may, of course, relate to other types of panels and structural elements just as advantageously, for example a lower panel or "deflector" connected to a windscreen lower surround, a fuselage panel connected to a door or window surround, or even a fuselage front or rear sealed bulkhead connected to a sealed bulkhead surround.

In general, the invention therefore allows robust assembly of a self-stiffened panel with an adjacent structural element, and thus makes it possible to enjoy the full benefit of the advantages inherent to self-stiffened panels within an aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft assembly comprising:
a structural element, and
a self-stiffened panel comprising a skin and a stiffening structure incorporated into the skin and formed of a network of ribs,
the structural element comprising at least one end formed of a first closure rib,
the stiffening structure of the self-stiffened panel comprising at least one end formed of a second closure rib,
the stiffening structure of the self-stiffened panel comprising a portion of which the height increases progressively as far as the second closure rib,
the structural element being fixed to the self-stiffened panel by means of first through-fixing elements which fix the first closure rib to the second closure rib, and
the structural element comprising a sole having a first face on a side of the sole where the first closure rib is formed, and a second face on an opposite side, and the sole has, on the second face, an insert delimiting a space at an end part of the sole, into which extends an end part of the skin of the self-stiffened panel.

2. The aircraft assembly according to claim 1, wherein said portion of the stiffening structure of the self-stiffened panel is formed of chamfered ribs which are inclined with respect to the second closure rib and connect the second closure rib to another rib of the stiffening structure.

3. The aircraft assembly according to claim 2, wherein said other rib of the stiffening structure extends parallel to the second closure rib.

4. The aircraft assembly according to claim 1, wherein the first through-fixing elements pass jointly through the first closure rib and the second closure rib.

5. The aircraft assembly according to claim 4, wherein the first through-fixing elements are tension bolts.

6. The aircraft assembly according to claim 1, wherein the end part of the sole of the structural element and the end part of the skin of the self-stiffened panel are fixed together by means of second through-fixing elements.

7. The aircraft assembly according to claim 6, wherein the second through-fixing elements pass jointly through the end part of the sole and the end part of the skin.

8. The aircraft assembly according to claim 1, wherein the structural element comprises a main rib, and secondary ribs which connect the main rib to the first closure rib, and wherein the main rib and the secondary ribs project out from the first face of the sole.

9. The aircraft assembly according to claim 8, wherein each of the secondary ribs extends facing a region of connection to the second closure rib of at least one rib belonging to the network of ribs of the stiffening structure, which at least one rib is arranged on the other side of the second closure rib to the first closure rib.

10. The aircraft assembly according to claim 8, wherein the secondary ribs each have a height which decreases in a direction extending from the main rib towards the first closure rib.

11. The aircraft assembly according to claim 1, wherein the structural element is a windscreen surround, and the self-stiffened panel forms a visor or a fuselage deflector.

12. The aircraft assembly according to claim 1, wherein the structural element is a door or window surround, and the self-stiffened panel is a fuselage panel.

13. The aircraft assembly according to claim 1, wherein the structural element is a sealed bulkhead surround, and the self-stiffened panel forms an aircraft fuselage front or rear sealed bulkhead.

14. The aircraft assembly according to claim 1, wherein the first closure rib forms a flanged web.

15. An aircraft assembly comprising
a structural element, and
a self-stiffened panel comprising a skin and a stiffing structure incorporated into the skin and formed of a network of ribs, the structure element comprising at least one end formed of a first closure rib, the stiffening structure of the self-stiffened panel comprising at least one end formed of a second closure rib, the structural element being fixed to the self-stiffened panel by means of first through-fixing elements which fix the first closure rib to the second closure rib, and the structural element comprising a sole having a first face on a side of the sole where the first closure rib is formed, and a second face on an opposite side, and the sole has, on the second face, an inset delimiting a space at an end part of the sole, into which extends an end part of the skin of the self-stiffened panel, the first closure rib forming a flange, wherein the network of ribs comprises an isogrid.

* * * * *